United States Patent [19]

Erikson et al.

[11] Patent Number: 4,566,345

[45] Date of Patent: Jan. 28, 1986

[54] TOOL CARRIER ASSEMBLY

[76] Inventors: Kenneth W. Erikson, 73 Spaulding Dr., Merrimack, N.H. 03054; Keith W. Erikson, 7 Quarry Circle Dr., Milford, N.H. 03055

[21] Appl. No.: 633,338

[22] Filed: Jul. 23, 1984

[51] Int. Cl.[4] .............................................. F16C 33/20

[52] U.S. Cl. ............................ 74/89.15; 308/DIG. 7; 308/DIG. 8; 384/908

[58] Field of Search ............................ 74/89.15, 89.2; 308/DIG. 7, DIG. 8; 384/907, 908

[56] References Cited

U.S. PATENT DOCUMENTS

| | | | |
|---|---|---|---|
| 2,835,540 | 5/1958 | Jorgensen . | |
| 2,950,149 | 8/1960 | Thomson . | |
| 3,072,448 | 1/1963 | Melton et al. | 308/DIG. 7 |
| 3,243,236 | 3/1966 | Graham . | |
| 3,479,099 | 11/1969 | Krause . | |
| 3,774,983 | 11/1973 | Lagally | 308/DIG. 8 |
| 3,920,293 | 11/1975 | Takeuchi . | |
| 4,054,337 | 10/1977 | Simsbury . | |
| 4,107,381 | 8/1978 | Butzow et al. | 308/DIG. 8 |
| 4,109,978 | 8/1978 | Ernst et al. | 308/DIG. 8 |
| 4,193,645 | 3/1980 | Baker et al. | 308/DIG. 8 |
| 4,198,871 | 4/1980 | Dunn et al. | 74/89.2 |
| 4,312,195 | 1/1982 | Nurk . | |

FOREIGN PATENT DOCUMENTS

| | | | |
|---|---|---|---|
| 748864 | 5/1956 | United Kingdom | 308/DIG. 7 |
| 757582 | 9/1956 | United Kingdom | 308/DIG. 7 |
| 1436103 | 5/1976 | United Kingdom | 308/DIG. 8 |
| 1504568 | 3/1978 | United Kingdom | 308/DIG. 8 |

*Primary Examiner*—Lawrence J. Staab
*Attorney, Agent, or Firm*—Hamilton, Brook, Smith & Reynolds

[57] ABSTRACT

A tool carrier assembly comprising a carrier (2) which supports a tool (6) for reciprocating motion along guide rails (8). There are bearings (14) on the carrier engageable with the guide rails in which assembly the guide rails and the bearing are fabricated from dissimilar plastics.

2 Claims, 2 Drawing Figures

TOOL CARRIER ASSEMBLY

DESCRIPTION

1. Field of the Invention

This invention relates to a tool carrier assembly having anti-friction bearings which must be reliable in operation without the impedance of unwanted friction or wear.

2. Background of the Invention

Many modern mechanisms embody tools which reciprocate relative to substantially stationary workpieces which repeat their motion over a fixed path for long periods of time. A particular example of such mechanism is a high speed printer used in conjunction with computers or typewriters which are either manually or electronically operated. A printer head is caused to reciprocate in a fixed path back and forth relative to a platen or roll which moves plain paper, graph paper or the like transversely of the path of the printer. The printer head, or any other tool for that matter, is normally supported on a carrier which translates back and forth between fixed limits relative to the path of movement of the paper. Reciprocating motion is imparted to the carrier and hence to the printer head or tool, often by a lead screw which is rotatable in both clockwise and counterclockwise directions in a fixed time sequence. Through threaded engagement with the carrier, the lead screw causes the carrier to move back and forth on guide rails which are fixed relative to the path of movement of the paper. The tool is moved by the carrier to engage the workpiece, or more specifically in the case of a printer, to imprint the paper.

Frequently the time the printer is in operation lasts for hundreds of hours, being computer-controlled, thus resulting in thousands of reciprocations of the tool carrier in a given day. This can promote wear of the guide rails and/or undesirable variations in the linear speed of the carrier due to fluctuations in the frictional engagement between the tool carrier and the guide rails.

An obvious solution to the wear and friction problem is continuous lubrication of the guide rails and/or the bearing members of the tool carrier which engage the guide rails. Continuous lubrication is not an altogether satisfactory solution because the rate of application of the lubricant is not easily controlled, and excess lubricant can get onto the paper or other workpiece and cause soilage.

It is not uncommon to periodically or intermittently lubricate the guide rails and the tool carrier bearings, but after continuous usage lubricant often dries out unevenly lengthwise of the guide rails resulting in uneven frictional engagement between the guide rail and the bearings causing pulsating drag resulting in uneven spacing of the printer relative to the paper.

Another obvious solution employed in the past is the use of roller or ball bearings which, while they do reduce friction, create other problems, one of which is the requirement for lubrication and another being a relatively high cost relative to the other machine components.

Usually, the guide rails are made of stainless steel which is precision machined and processed to a highly polished exterior surface and having close radial tolerance. This is not only expensive but time consuming in manufacturing.

SUMMARY OF THE INVENTION

As a solution to the above problems, Applicants have provided a tool carrier assembly comprising a carrier which supports a tool for reciprocating motion on a pair of guide rails. The carrier has bearings which are engageable with the guide rails as motor means reciprocate the carrier back and forth along the rails. The guide rails and the bearings are made of use of dissimilar plastics. Each guide rail is constructed of a solid core in a sheath of plastic surrounding it and constituting its outer surface. The plastic is shrunk fit around the core, and its surface is centerless ground to produce a smooth, uniform, low-friction surface.

Applicants have found that the dissimilar plastics results in substantially lower wear rates and coefficients of friction as distinguished from when both the bearings and the guide rails are made of the same plastic material. The plastics may, for example, be nylon and acetyl or nylon and polycarbonate. Furthermore, Applicants have found that while nylon and acetyl or polycarbonate as the dissimilar plastics are highly satisfactory, the addition of filler material such as polytetrafluoroethylene (PTFE) has beneficial results in further reducing friction and wear.

The above and other features of the invention including various novel details of construction and combinations of parts will now be more particularly described with reference to the accompanying drawings and pointed out in the claims. It will be understood that the particular tool carrier assembly embodying the invention is shown by illustration only and not as a limitation of the invention. The principles and features of this invention may be employed in varied and numerous embodiments without departing from the scope of the invention.

DETAILED DESCRIPTION OF THE INVENTION

Figure 1:
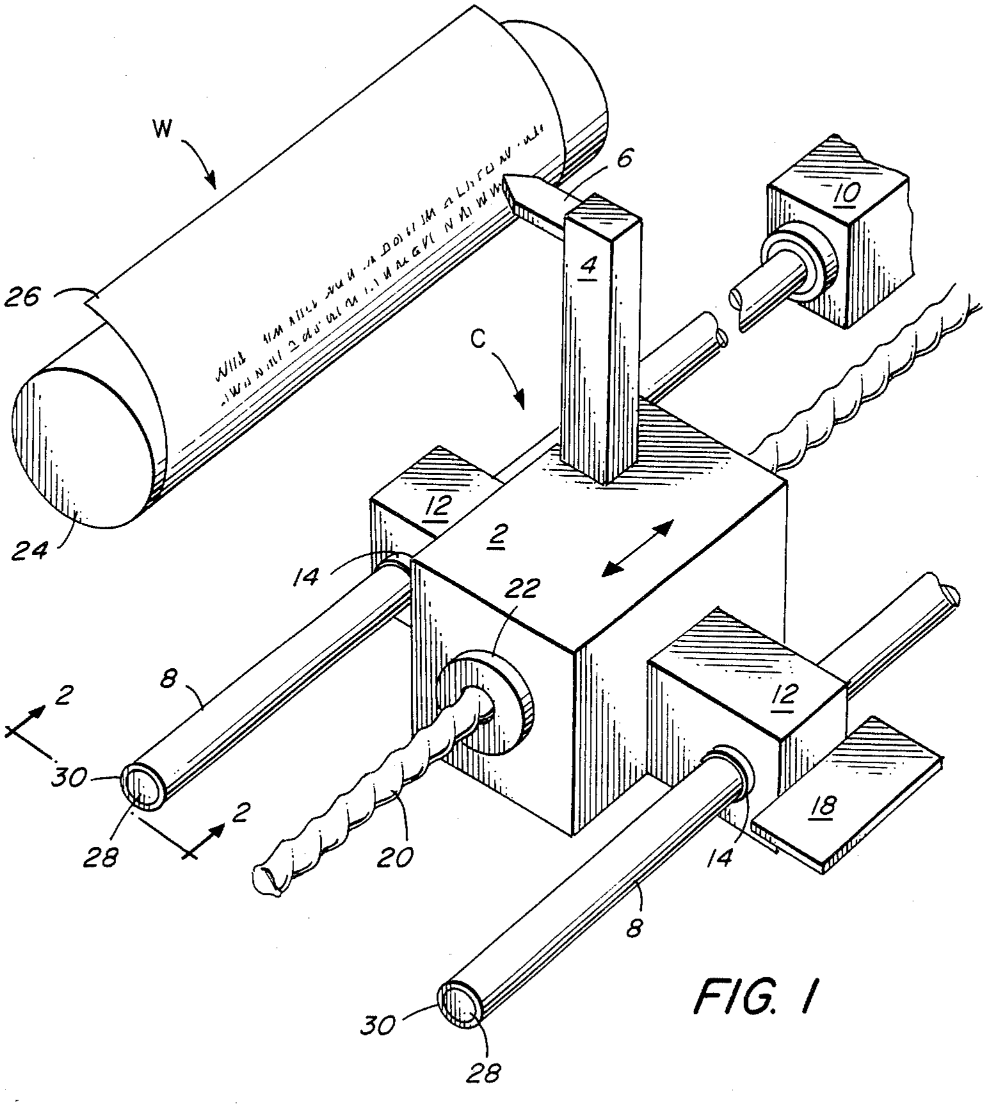
FIG. 1 is a perspective schematic view of a tool carrier assembly including a carrier mounted for reciprocating motion on guide rails and which assembly illustrates features of the present invention.

A tool carrier assembly embodying features of the present invention is designated C and includes a tool carrier 2 mounting a support 4 which carries a tool 6 at its upper end. The tool carrier is represented by a rectangular block, and the support 4 and the tool 6 are schematically depicted as representing any tool but for purposes of illustration represents a printer head. Laterally of the tool carrier are a pair of guide rails 8 which are firmly attached to and supported at each end by a rigid support 10 (only one of which is shown) forming part of the machine frame.

Extending laterally of the tool carrier are a pair of bearing supports 12, each carrying a bearing 14 which slides on the guide rails 8. An auxiliary mounting means 18 is shown attached to one of the bearing supports 12 and is often employed to carry mechanisms ancillary to the tool. Being located laterally of the tool carrier on one side, the mounting means and the structure it supports often induces an uneven load on the tool carrier which intensifies both the friction between the bearings 14 and the guide rails 8 as well as their wear.

Reciprocating linear motion is imparted to the tool carrier 2 by a threaded lead screw 20 which engages a mating threaded member 22 in the tool carrier. Motor means (not shown) causes the screw to be rotated alternately in both clockwise and counterclockwise directions by a computer-operated drive to effect direction reversal of the tool carrier 2. Optionally, anti-backlash nut mechanism as disclosed in U.S. Pat. No. 4,249,426 may be employed to eliminate backlash between the screw and the tool carrier.

The tool carrier, and hence the tool, reciprocates relative to a workpiece W herein illustrated as a conventional roll supporting a sheet of paper. The workpiece W could, as well, be a cylinder to be machined and the tool 6 a cutting bit.

As an alternative construction, the tool carrier 2 may be driven in its reciprocating path, for example, by a conventional wire and pulley mechanism (not shown) attached respectively to the tool carrier and drive means on the machine frame.

Figure 2:
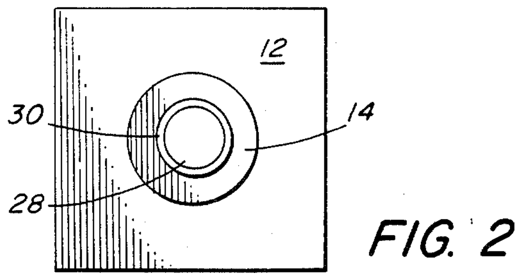
FIG. 2 is an end view of a guide rail and bearing taken in the direction of the arrow II on FIG. 1.

Heretofore guide rails 8 were made of stainless steel rods, machined to a high tolerance and finished with a mirror-like surface to produce the lowest possible friction. Not only is the material itself expensive but the machining required results in high costs of the finished part. As seen in FIG. 2, in accordance with the present invention each guide rail 8 comprises a core 28 of metal rod stock requiring no machining. Surrounding the core is a sleeve of plastic 30. The reason the guide rails are made of composite material is because were they made entirely of plastic, they would have a tendency to bow under the weight of the tool carrier resulting in non-linear motion of the tool. The core or inner rod 28 offers structural rigidity while the outer sleeve 30 provides a wear resistant, low friction bearing surface. As an alternative, the core could be made of glass or ceramic as long as it offers the necessary structural rigidity.

Each guide rail 8 is made by extruding a plastic sleeve around the core 28 and allowing it to cool whereupon it shrinks into a tight non-moving relationship around the core. Were the plastic applied, for example, by sliding a sleeve over the rod and then shrinking it into engagement with the core, it is possible for air to be trapped between the sleeve and the core to form pockets resulting in bulges in the surface of the guide rail.

After the plastic has been shrunk around the core, the assembled composite guide rail is finished by centerless grinding to produce a uniform, cylindrical surface of high tolerance and low friction. It will be understood that whereas the guide rail is shown to be circular cross section, it may, if desired, have other configurations as for example square, rectangular, or even in the form of an equilateral triangle. For purposes of illustration, the core is one half inch diameter cold drawn steel. The outer diameter of the extruded plastic is approximately 0.53 inches whereby its initial wall thickness is 0.015 inches. After the centerless grinding process, the wall diameter of the plastic will be approximately 0.010 inches. Total diameter of the finished rod is approximately 0.520 inches.

Bearings 14 carried by the bearing supports 12 are illustrated as circular sleeve bearings which are molded from a plastic material. Their inner diameters are circular in cross section to fit on the circular guide rail 8. The bearings would, of course, be formed complimentary to the guide rails whatever their cross sectional shape is.

Applicants have determined that optimum operating conditions exist when the plastic from which the sleeves 30 of the guide rails are made and the plastic from which the bearings 14 are made are dissimilar. As an example, the guide rail sleeves are made of nylon and the bearings made of acetyl copolymer. The coefficient of friction between these members is lower than if both members were made of nylon or both of acetyl. Similarly, when one member is made of nylon, and the other made, for example, of polycarbonate, the coefficient of friction is lower than if both members were made either of nylon or polycarbonate. Not only does the use of dissimilar plastics result in lower coefficients of friction, but the wear factor between the members is also lower.

Based upon empirical data, it has been found that if both members were made of unmodified acetyl copolymer, the dynamic coefficient of friction would be 0.15. But when one of the members is unmodified acetyl copolymer and the other nylon 6/6, the dynamic coefficient of friction is reduced to 0.05. This is found to be consistent, regardless of which member is made of nylon and which of acetyl.

Similar empirical data has established that the wear factors between dissimilar plastics are substantially less than when the same plastic materials are used for both members. For example, where both members are to be made of acetyl, a wear factor in the order of magnitude of 10,000 could be expected and when both members are made of unmodified nylon 6/6, a wear factor in the order of magnitude of 1,000 can be expected. However, when one of the members is acetyl and one nylon 6/6, the wear factors can be expected to be reduced to an order of magnitude of 50.

Similar empirical data has been established to show similar results, both in wear factors and in dynamic coefficients of friction when nylon and polycarbonate are selected for the guide rails and the bearing.

Further reductions in both dynamic coefficients of friction and wear factors can be expected from the use of additives in the unmodified plastic materials. For example, polytetrafluoroethylene (PTFE) has been found to be most satisfactory for this purpose when the plastic material has about 20% PTFE added to it.

Applicants believe that the friction and wear properties of plastic materials, particularly polymers, are influenced by many factors, such as their surface energies, their interfacial energies, the strength of the material itself, and also whether or not they are ductile or brittle. The wear factor usually follows a fourth or fifth power relationship to the coefficient of friction.

When two polymer members are in sliding contact and they are made of identical or similar material, the interfacial energy of the system is near zero, and the two members at the points of contact would tend to adhere to each other as a result of solution of molecules in each other.

However, with polymers which are dissimilar, the interfacial energy would be high but the adhesion would be small. If the polymers were insoluble in each other on a molecular scale, their bonding or fusing tendencies would be substantially lower and consequently the coefficient of friction would be lower. Applicants also believe that polymers with high surface energies and low strength will show high coefficients of friction when sliding on themselves. The wear factor while dependent primarily on the coefficient of friction is also dependent on the ductility of the particular polymer, the more brittle polymers showing greater wear rate.

When employing dissimilar polymers, a lower coefficient of friction can be expected because the friction is proportional, it is thought to the sum of the surface energies minus the interfacial energy of the pair divided by the strength of the weaker of the two polymers. Consequently, the higher the interfacial energies the lower will be the coefficient of friction and the interfacial energy will be progressively higher for a pair of polymers that are more and more dissimilar in their molecular makeup.

Predicated upon the above, Applicants have formed the sleeves 30 of the guide rails 8 of nylon 6/6 and the bearings 14 of acetyl copolymer, each containing 20% PTFE. Furthermore, the bearings 14 can be interchanged with ones made of polycarbonate containing from 10 to 20% PTFE with similar good results, both with respect to having a low coefficient of friction and a comparatively low wear factor.

In operation, the mechanism is assembled as shown schematically in FIG. 1 with the acetyl or polycarbonate bearings 14 riding on the composite guide rails 8 which have nylon sleeves 30 over steel rod stock. No lubrication is necessary; accordingly, there is no chance of a lubricant drying out and causing points of drag lengthwise of the rod, nor is there any chance of a lubricant getting onto the workpiece or paper. The tool carrier 2 is reciprocated back and forth across the guide rails 8 while the tool 6 performs its operation. The motion of the tool carrier is imparted by alternate clockwise and counterclockwise rotation of the lead screw

20. The low wear factor and low coefficient between the nylon and the acetyl or polycarbonate bearing is such that the little or no wear or drag takes place over long periods of time even when eccentric loads are applied through the mounting means 18. The presence of the steel core 28 in the guide rails offers adequate structural rigidity to assure that the tool carrier's path does not deviate from linear.

What we claim is:

1. A tool carrier assembly comprising: a carrier supporting a tool for reciprocating motion;
- guide rails;
- means for reciprocating the carrier along the guide rails;
- the guide rails comprising a core of metal rod stock with a sheath of plastic material surrounding the core,
- the sheath having a ground surface;
- sleeve bearings on the carrier engageable with the guide rails;
- the plastic sheath being made of extruded nylon containing approximately 20% of polytetrafluoroethylene,
- the bearings being made of molded acetyl copolymer containing approximately 20% of polytetrafluorethylene.

2. Tool carrier according to claim 1 wherein the bearings are made of polycarbonate containing from 10 to 20% of polytetrafluoroethylene.

* * * * *